Patented Jan. 28, 1936

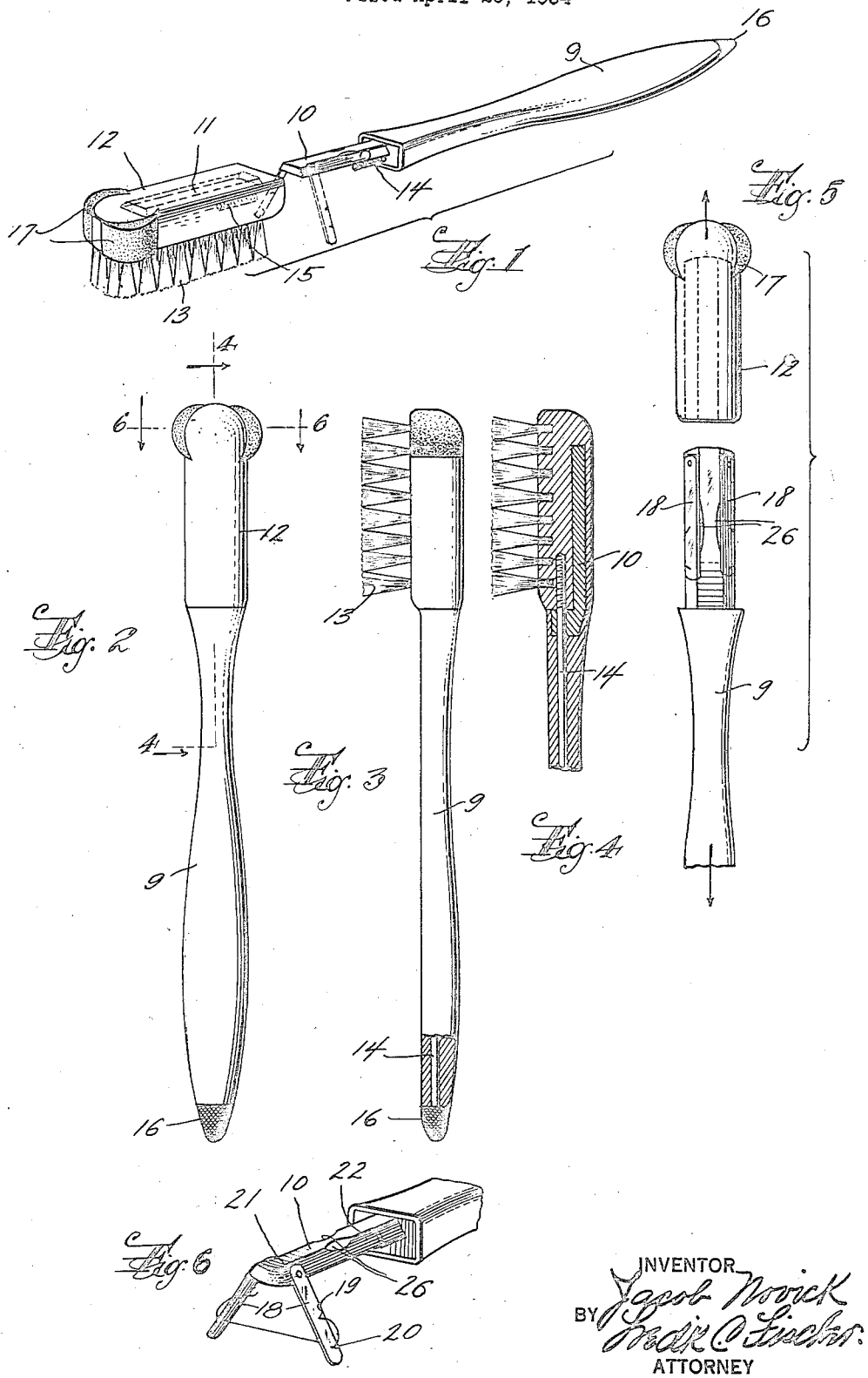

2,029,031

UNITED STATES PATENT OFFICE 2,029,031

DENTAL FLOSS HOLDER FOR TOOTHBRUSHES

Jacob Novick, Newark, N. J.

Application April 25, 1934, Serial No. 722,243

2 Claims. (Cl. 132—91)

This invention relates to toothbrushes and more particularly to a dental floss holder adapted to be combined with a toothbrush.

The principal object of the invention is to provide a novel dental floss holder as part of a toothbrush, the holder having floss supporting means carried and housed by telescopic members adapted to form the handle and head of a toothbrush.

This and other advantageous objects which will later appear, are accomplished by the simple and practical construction and arrangement of parts hereinafter described and exhibited in the accompanying drawing, forming part hereof, and in which:

Fig. 1 is a perspective view showing a toothbrush embodying my invention,

Fig. 2 is a plan view of a toothbrush in an assembled condition,

Fig. 3 is an elevational view of the toothbrush,

Fig. 4 is a sectional view of the toothbrush, taken on lines 4—4 of Fig. 2,

Fig. 5 is an exploded plan view showing details of the toothbrush,

Fig. 6 is a perspective view showing details of the handle enabling the use of dental floss.

Referring to the drawing, in Fig. 1 the toothbrush is shown to comprise a handle member 9 which may be made of bone, hard rubber, or the like, and which has embedded or fixed therein a bar 10 which may be made of metal or hard rubber, said bar being adapted to be inserted into a slot 11 in the base 12 of a replaceable brushing element, said base 12 being provided with brushing bristles 13. Also projecting from the handle 9 is a threaded rod 14 which enters and engages a threaded recess 15 in the base 12. The rod 14 extends through the handle and has a knurled extremity 16 by means of which the rod can be rotated and screwed into the recess 15 to rigidly attach the handle 9 to the base 12 after the bar 10 has been inserted in the recess 11.

In order to enable the massaging of the gums, the base 12 is provided at the outer extremity thereof with rounded soft rubber elements 17, the latter being arranged so that they can be rubbed against the gums for massaging purposes.

The bar 10 has inclined sides, and pivotally attached thereto are members 18, adapted to assume a position as shown in Fig. 6 to enable the use of dental floss for cleaning between the teeth. Each of the members 18 is provided with a pair of notches 19 and 20 which hold the dental floss in position. The bar 10 is provided with shoulders 21 which limit the rotary movement of the members 18; and the bar also has cut out portions 22 to receive the members 18 when the bar is inserted into the recess 11, the cut-out portion 22 enabling the members 18 to lie flush with the remainder of the bar 10, as shown in Fig. 5.

The foregoing disclosure is to be regarded as descriptive and illustrative only, and not restrictive or limitative of the invention, of which obviously an embodiment may be constructed including many modifications without departing from the general scope herein indicated and denoted in the appended claims.

The metal bar 10 is preferably provided with finger grooves 26 to enable the members 18 to be easily manipulated.

Having thus described my invention, what I claim as new and desire to secure by Letters Patent, is:

1. In a device of the kind described, a handle member having a projecting prismatic end having a pair of opposite side faces at angularly disposed planes, a pair of floss holding arms pivoted to the forward ends of said side faces to lie flat against the faces in housed position, said arms having means at their free ends to attach a strand of dental floss said arms being movable on their pivots from inoperative positions parallel to the sides to which they are pivoted to operative positions in a plane at right angles to the axis of the prism whereby a strand of dental floss attached to the free ends of the arms in their inoperative position will be stretched as the arms are moved to operative position.

2. In a device of the kind described, a handle member having a projecting end having a pair of opposite side faces, a pair of floss holding arms pivoted to the forward ends of said side faces to lie flat against the faces in housed position, said arms having means at their free ends to attach a strand of dental floss said arms being movable on their pivots from inoperative positions parallel to the sides to which they are pivoted to operative positions in a plane at right angles to the axis of the pivot whereby a strand of dental floss attached to the free ends of the arms in their inoperative position will be stretched as the arms are moved to operative position.

JACOB NOVICK.